US011928134B1

(12) United States Patent
Margolin

(10) Patent No.: US 11,928,134 B1
(45) Date of Patent: Mar. 12, 2024

(54) MEDOID-BASED DATA COMPRESSION

(71) Applicant: INTUIT INC., Mountain View, CA (US)

(72) Inventor: Itay Margolin, Hamerkaz (IL)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 17/823,925

(22) Filed: Aug. 31, 2022

(51) Int. Cl.
*G06F 16/30* (2019.01)
*G06F 16/28* (2019.01)

(52) U.S. Cl.
CPC .................................. *G06F 16/285* (2019.01)

(58) Field of Classification Search
CPC ..................................................... G06F 16/285
See application file for complete search history.

(56) References Cited

U.S. PATENT DOCUMENTS 11,526,424 B2 * 12/2022 Deng .................... G06F 11/362
2015/0356163 A1 * 12/2015 Matteson ............. G06F 16/285 707/738
2018/0137155 A1 * 5/2018 Majumdar .......... G06F 16/9024
2019/0130017 A1 * 5/2019 B .......................... G06F 16/285
2020/0364516 A1 * 11/2020 Krasner ................. G06N 3/088
2021/0286834 A1 * 9/2021 Morse ................... G06F 16/906
2022/0197868 A1 * 6/2022 Dovzhenko ......... G06F 16/1744
2023/0019207 A1 * 1/2023 Natanzon .............. G06F 3/0641
2023/0125308 A1 * 4/2023 Ezrielev ................. G06N 20/00 707/737

FOREIGN PATENT DOCUMENTS

CN 114721658 A * 7/2022
KR 20210112672 A * 9/2021

* cited by examiner

*Primary Examiner* — Khanh B Pham
(74) *Attorney, Agent, or Firm* — Patterson + Sheridan, LLP

(57) ABSTRACT

Certain aspects of the present disclosure provide techniques for medoid-based data compression. One example method generally includes receiving item data indicative of one or more items, determining one or more medoids based on the item data, determining, for each item of the one or more items, a corresponding medoid based on the one or more medoids, identifying, for each item of the one or more items, a difference between the item and the corresponding medoid for the item, storing the one or more medoids, and storing, for each item of the one or more items, the identified difference between the item and the corresponding medoid.

16 Claims, 6 Drawing Sheets

500

Receive Item Data — 510

Determine One Or More Medoids — 520

Determine, For Each Item Of The One Or More Items, A Corresponding Medoid — 530

Identify, For Each Item Of The One Or More Items, A Difference — 540

Store The One Or More Medoids — 550

Store, For Each Item Of The One Or More Items, The Identified Difference — 560

200

210

| Index | Input Item Data |
|---|---|
| 1 | Hello my name is Itay **202a** |
| 2 | Hello my name is Ella **202b** |
| 3 | Hello my name is Moshe **202c** |
| 4 | Dear Matan, thank you for the message **202d** |
| 5 | Dear Yair, thank you for the message **202e** |
| 6 | Dear Shmulik, thank you **202f** |

encoding

220

| Index | Encoded Items |
|---|---|
| 1 | "$Itay" **204a** |
| 2 | "$Ella" **204b** |
| 3 | "$Moshe" **204c** |
| 4 | "+Matan, & *" **204d** |
| 5 | "+ Yair, & *" **204e** |
| 6 | "+ Shmulik, &" **204f** |

230

| symbol | encoded message |
|---|---|
| + | Dear |
| & | thank you |
| $ | Hello my name is |
| * | for the message |

FIG. 2

| Index | Encoded Items |
|---|---|
| 1 | "$Itay" **204a** |
| 2 | "$Ella" **204b** |
| 3 | "$Moshe" **204c** |
| 4 | "+Matan, & *" **204d** |
| 5 | "+ Yair, & *" **204e** |
| 6 | "+ Shmulik, &" **204f** |

| | 1 | 2 | 3 | 4 | 5 | 6 |
|---|---|---|---|---|---|---|
| 1 | 0 | 4 | 5 | 11 | 10 | 12 |
| 2 | 4 | 0 | 5 | 11 | 11 | 11 |
| 3 | 5 | 5 | 0 | 11 | 11 | 11 |
| 4 | 10 | 11 | 11 | 0 | 4 | 9 |
| 5 | 10 | 11 | 11 | 4 | 0 | 8 |
| 6 | 12 | 11 | 11 | 9 | 8 | 0 |

| correponding medoid index |
|---|
| 1 |
| 1 |
| 1 |
| 6 |
| 6 |
| 6 |

MEDOID-BASED DATA COMPRESSION

INTRODUCTION

Aspects of the present disclosure relate to medoid-based data compression.

The recent proliferation of electronic data has created opportunities as well as new challenges. The quantity of electronic data available has increased drastically, and such data can be used by software applications to help discover trends or insights. Usually a software application only uses some aspects (also called features) of the data, while a different software application may use a different set of features of the data. Storing electronic data in a practical manner ensures access to the data by different software applications. In addition, historical data can be stored for future analysis (e.g., time series analysis) by software applications.

Data can be itemized and each item can be stored as a file. Storing a vast quantity of data is costly, as traditional file storage methods require large capacities of storage device(s) and can incur high costs. For example, storing a large amount of electronic data related to one or more software applications may require a large amount of physical computing storage resources to be utilized and maintained.

Accordingly, systems and methods are needed to compress the electronic data when stored to mitigate the soaring costs in physical computing storage resources as the quantity of electronic data keeps growing.

BRIEF SUMMARY

Certain embodiments provide a method for medoid-based data compression. The method generally includes receiving item data indicative of one or more items, determining one or more medoids based on the item data, determining, for each item of the one or more items, a corresponding medoid based on the one or more medoids, identifying, for each item of the one or more items, a difference between the item and the corresponding medoid for the item, storing the one or more medoids, and storing, for each item of the one or more items, the identified difference between the item and the corresponding medoid.

Another embodiment provides a system for medoid-based data compression. The system generally includes a memory including computer-executable instructions and a processor configured to execute the computer-executable instructions. Executing the computer executable-instructions causes the system to receive item data indicative of one or more items, determine one or more medoids based on the item data, determine, for each item of the one or more items, a corresponding medoid based on the one or more medoids, identify, for each item of the one or more items, a difference between the item and the corresponding medoid for the item, store the one or more medoids, and store, for each item of the one or more items, the identified difference between the item and the corresponding medoid.

Still another embodiment provides a non-transitory computer readable medium for efficiently rendering form data. The non-transitory computer readable medium generally includes instructions to be executed in a computer system, wherein the instructions when executed in the computer system perform a method for medoid-based data compression on a computing device requiring minimal run time processing. The method generally includes receiving item data indicative of one or more items, determining one or more medoids based on the item data, determining, for each item of the one or more items, a corresponding medoid based on the one or more medoids, identifying, for each item of the one or more items, a difference between the item and the corresponding medoid for the item, storing the one or more medoids, and storing, for each item of the one or more items, the identified difference between the item and the corresponding medoid.

The following description and the related drawings set forth in detail certain illustrative features of the various embodiments.

BRIEF DESCRIPTION OF THE DRAWINGS

The appended figures depict certain aspects of certain exemplary embodiments and are therefore not to be considered limiting of the scope of this disclosure.

FIG. 2 depicts an example encoding scheme for medoid-based data compression.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and non-transitory computer readable mediums for medoid-based data compression.

Different pieces of itemized data can share a large degree of commonality (e.g., having common features, sharing common structure, or including common parts). Grouping the itemized data according to the degree of commonality is a challenge. Fortunately, machine learning techniques, such as clustering, can be used to group itemized data according to the degree of commonality. The groups generated are known as clusters. Various clustering algorithms can designate a subset of itemized data as a cluster. Each cluster of itemized data can have a medoid, which is a most centrally located object in the cluster. The clustering algorithm can help associate each data item in a cluster with its corresponding medoid (e.g., the medoid of the cluster). However, different clustering algorithms can generate different clusters and different medoids.

For each data item and its corresponding medoid, a difference between the data item and the corresponding medoid can be identified. For example, the identified difference can be a set of instructions or operations needed to change from the corresponding medoid to the data item.

In some embodiments, the data item can be first encoded to generate an encoded item, based on an encoding scheme. Encoded items can require less memory to store than unencoded items. Accordingly, a clustering algorithm can determine clusters and the medoids for the clusters based on the encoded items. In such embodiments, the identified difference between an encoded item and the corresponding medoid for the encoded item can be also encoded. Accordingly, the encoded identified difference can be decoded using an inverse mapping of the encoding scheme.

Consequently, the medoids and the identified difference for each data item can be stored separately into a storage device, such as a database. The stored medoids and identified differences can be used to recreate each data item. For example, a data item can be recreated by applying the identified difference of the data item to its corresponding medoid. Since the identified difference of a data item almost always requires significantly less storage space than the data item itself, this can help mitigate high storage costs for a large quantity of data. For example, by storing a medoid of a cluster of data items only once and then for each individual data item in the cluster storing only the difference between the medoid and the data item, embodiments of the present disclosure significantly reduce the amount of physical computing storage resources required to store the data items in the cluster, thereby improving the functioning of the computer systems involved.

Figure 1:
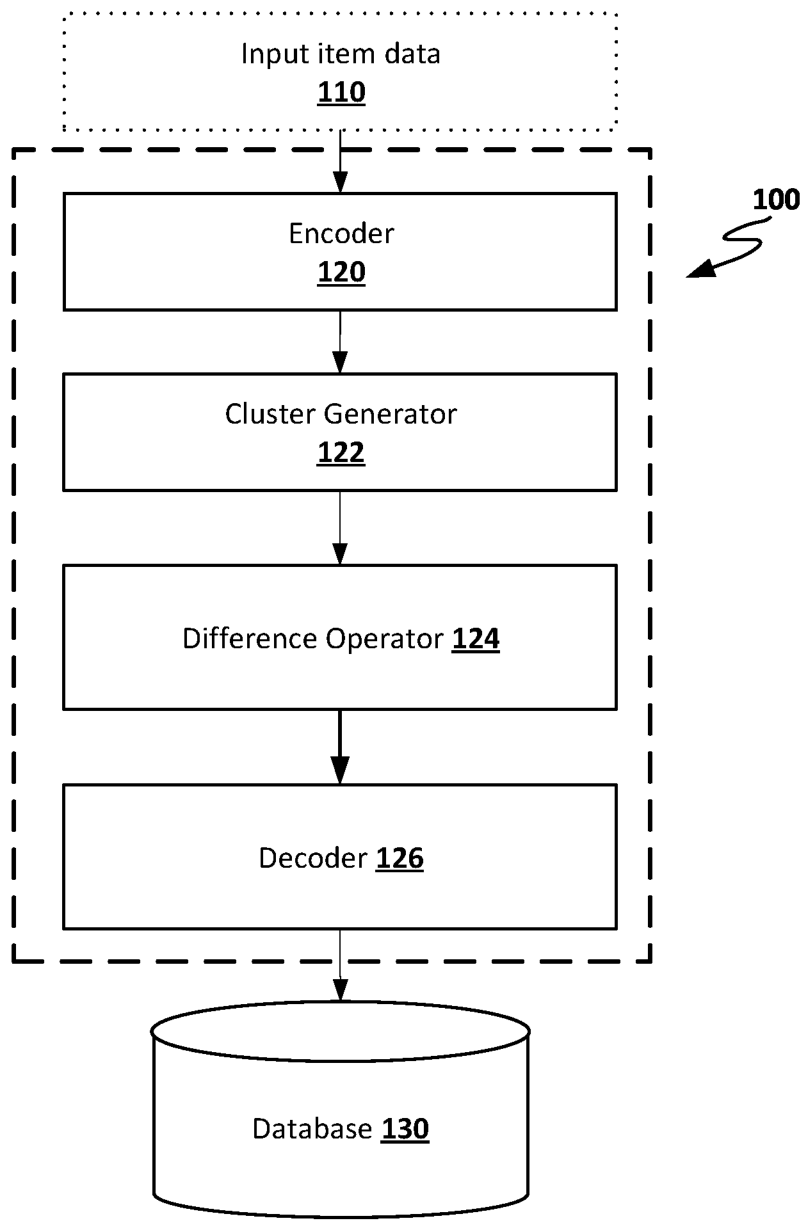
FIG. 1 depicts an example compressor for medoid-based data compression.

FIG. 1 depicts an example compressor 100 for data compression. Compressor 100 includes encoder 120, cluster generator 122, difference operator 124 and decoder 126. Compressor 100 can take as inputs input item data 110 and can generate output to be stored in database 130.

Input item data 110 can be provided as input to compressor 100. Input item data 110 can include one or more items. In some examples, the items are of the same data type (e.g., represented using the same data structure). For example, the one or more items in input item data 110 can be textual data, image data, audio data, or video data. The one or more items in in input item data 110 can represent data not yet saved into a storage device (e.g., in a memory device), or can be generated from reading into memory existing files stored in a storage device.

Input item data 110 can be encoded by encoder 120 to generate encoded items. Depending on the data type of each item of the one or more items in input item data 110, encoder 120 can use a corresponding encoding scheme. The corresponding encoding scheme can be chosen from a set of possible encoding schemes. In an example, items in input item data 110 are textual data represented as one or more strings, and encoder 120 applies byte pair encoding (BPE) to each item of the one or more items. Alternatively, encoder 120 can apply a vector embedding algorithm (e.g., word2vec) to encode each item of the one or more items. In some examples, the encoding scheme used is bijective and is invertible, such that an inverse mapping can be used to decode the encoded items. Accordingly, each item in the one or more items can have a one-to-one correspondence with each encoded item (e.g., sharing an index value).

Encoded items can be used by cluster generator 122 to determine one or more medoids. Each medoid of the one or more medoids can be associated with a cluster. A cluster is a subset of the one or more items that share some commonality (e.g., having common features, sharing common structure, and/or including common parts). The medoid of a cluster is defined as the object in the cluster whose average dissimilarity to all the objects in the cluster is minimal, or in other words, the medoid is a most centrally located object in the cluster.

In some examples, during initialization, cluster generator 122 can compute distances from one encoded item to other encoded items based on a distance metric, such as L1 distance, L2 distance, or Levenstein distance. The distance metric used can be based on the data type of the one or more items in input item data 110. The computed distances can be represented using a matrix.

Cluster generator 122 can generate, using a clustering algorithm, one or more medoids based on the encoded items and the computed distances. For example, the clustering algorithm can be one of the standard clustering algorithms, such as k-medoids, k-means, density-based spatial clustering of applications with noise (DBSCAN), Gaussian mixture model (GMM) or hierarchical clustering. The number of clusters can be specified via hyperparameters for the clustering algorithms, such as the value of k for k-medoids. Different clustering algorithms used can determine different subsets of the encoded items as clusters, or choose different objects as medoids for a particular cluster. Accordingly, the one or more medoids are one or more of the encoded items. In some examples, the one or more medoids determined are indicated using index values as indicators. In some examples, an un-encoded item (e.g., an item in the one or more items in input item data 110) associated with a medoid (e.g., via a shared index value) is a medoid for the cluster of un-encoded items.

Cluster generator 122 can further determine, for each encoded item, a corresponding medoid based on the one or more medoids. For example, the clustering algorithm used by cluster generator 122 can partition the encoded items into one or more clusters, where each cluster has a corresponding medoid. Accordingly, every encoded item in a cluster is associated with a corresponding medoid.

Difference operator 124 can identify, for each encoded item, a difference between the encoded item and the corresponding medoid for the encoded item. For example, difference operator 124 can use the git diff operation on each of the encoded items and the corresponding medoid for the encoded item, with the corresponding medoid for the encoded item as the previous version. The difference can be a set of changes needed to change from the corresponding medoid for the encoded item to the encoded item. In some examples, the difference includes an indicator associated with the index of the corresponding medoid.

Decoder 126 can decode the one or more medoids and the identified difference between each encoded item and the corresponding medoid, respectively. For example, one or more medoids can be decoded using the inverse mapping of the encoding scheme used by encoder 120, such that the one or more decoded medoids are items in the one or more items in input item data 110. Similarly, the identified difference between each encoded item and the corresponding medoid can be decoded using the inverse mapping of the encoding scheme used by encoder 120 as well.

The decoded one or more medoids and the decoded difference between each encoded item and the corresponding medoid can be stored into database 130. In some examples, each decoded medoid is saved only once. In some examples, the decoded difference between each encoded item and the corresponding medoid includes an indicator associated with the index of the corresponding medoid.

In some examples, the input item data 110 is directly provided as input to cluster generator 122. In such examples, an encoder (e.g., encoder 120) or a decoder (e.g., decoder 126) is not used. Cluster generator 122 can determine one or more items in the input item data as medoids for one or more clusters. Difference operator 124 can identify, for each item of the one or more items, a difference between the item and the corresponding medoid for the item, similar to the discussion above. In some examples, the one or more items determined as the one or more medoids are stored into database 130. In such examples, the identified difference between each item of the one or more items and the corresponding medoid is saved separately into database 130

(e.g., associated with the corresponding medoid via an indicator indicating the index of the corresponding medoid).

The stored medoids and identified differenes can be used to recreate the each item of the one or more items. For example, an item can be recreated by applying the identified difference of the item to its corresponding medoid. Since the identified difference of an item usually requires less storage space than the item itself, this can help mitigate high storage costs for a large quantity of data.

FIG. 2 depicts an example encoding scheme 200. Encoding scheme 200 can be used by an encoder, such as encoder 120 shown in FIG. 1.

Table 210 illustrates input to an encoder. For example, table 210 includes a subset of input item data 110 shown in FIG. 1. Table 210 includes six entries of textual data represented as strings 202*a-f*. Each string 202*a-f* is associated with an index value (1-6 respectively).

Table 220 shows the resultant encoded strings 204*a-f*. For example, table 220 can be generated by an encoder using BPE with strings 202*a-f* as inputs. Each encoded string 204*a-f* can share a corresponding index value with each string 202*a-f* (e.g., 1-6 respectively). For example, encoded string 204*a* is string 202*a* after encoding, and both string 202*a* and encoded string 204*a* share index value 1.

Table 230 shows the BPE scheme used by the encoder to generate the encoded strings 204*a-f* based on input strings 202*a-f*. The first column shows the symbol representation after the encoding, whereas the second column shows the message before encoding. For example, the symbol "+" represents the string "Dear", which can be found in the second row of table 230.

In some examples, table 230 can be used by a decoder to decode messages, such as decoder 126 shown in FIG. 1. For example, when decoding messages, the decoder searches for the symbol representations in a string and replaces the symbols with the corresponding message before encoding.

Figure 3:
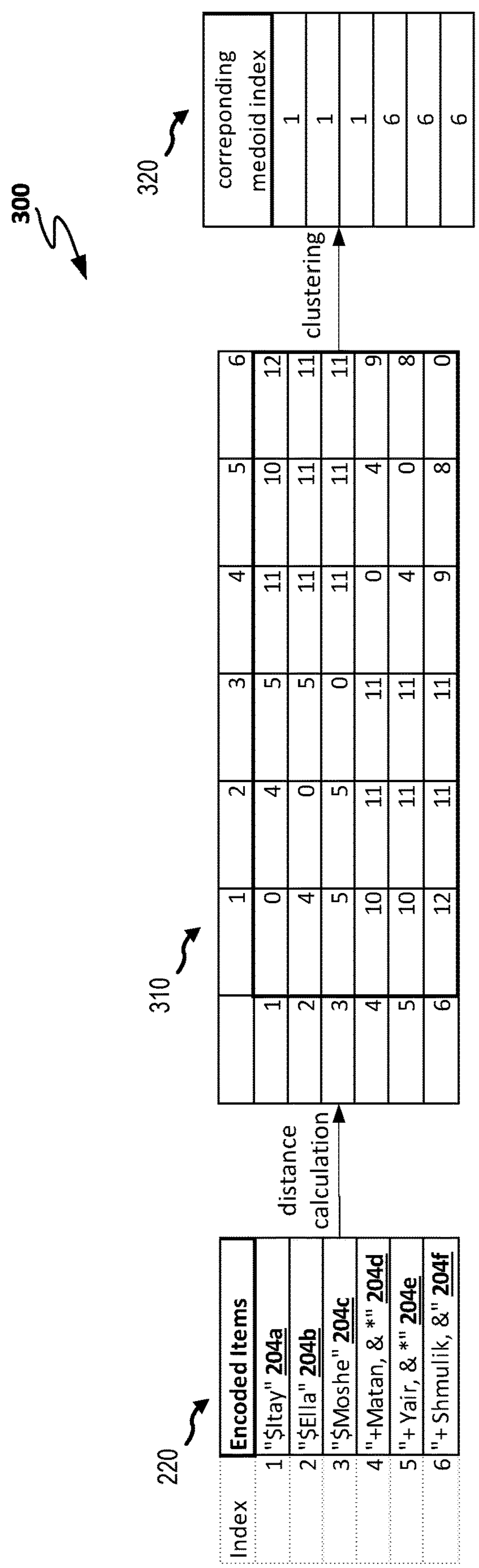
FIG. 3 depicts example clustering for medoid-based data compression.

FIG. 3 depicts an example clustering 300. Clustering 300 can be generated by a cluster generator, such as cluster generator 122 shown in FIG. 1. For example, clustering 300 can be generated with a clustering algorithm, such as k-medoids. Although clustering 300 illustrated is based on encoded items, such as encoded strings 204*a-f* in table 220, clustering 300 can be applied to un-encoded items, such as strings 202*a-f* in table 210, as well.

A cluster generator can take as input items, such as encoded strings 204*a-f* in table 220. The cluster generator can initialize the cluster generation by computing distances between encoded items. For example, for encoded string 204*a*, the distances between the encoded string 204*a* and the other encoded strings 202*b-f* can be computed according to a distance metric. In some examples, the distance metric is Levenstein distance.

Matrix 310 shows the Levenstein distances calculated based on encoded strings 204*a-f* in table 220. The first column and the first row indicates the corresponding indices of encoded strings 204*a-f*. For the rest of the rows and columns, the intersection indicates the Levenstein distance. The Levenstein distance between an encoded string and itself is 0, so that the diagonal entries of the matrix 310 are 0s, as illustrated in matrix 310.

Cluster generator can use a clustering algorithm to determine medoids for the clusters, based on the distances in matrix 310. Medoids are associated with clusters. In this example, two clusters are specified (e.g., via hyperparameters) and the indices of the medoids for the two clusters are 1 and 6, respectively. Encoded strings 204*a-c* are in the first cluster while encoded strings 204*d-f* are in the second cluster. Accordingly, encoded string 204*a* (with index value 1) is the medoid for the first cluster and encoded string 204*f* (with index value 6) is the medoid for the second cluster, as determined by a clustering algorithm. However, it should be noted that using a different clustering algorithm can result in different sets of clusters and different sets of medoids.

Figure 4:
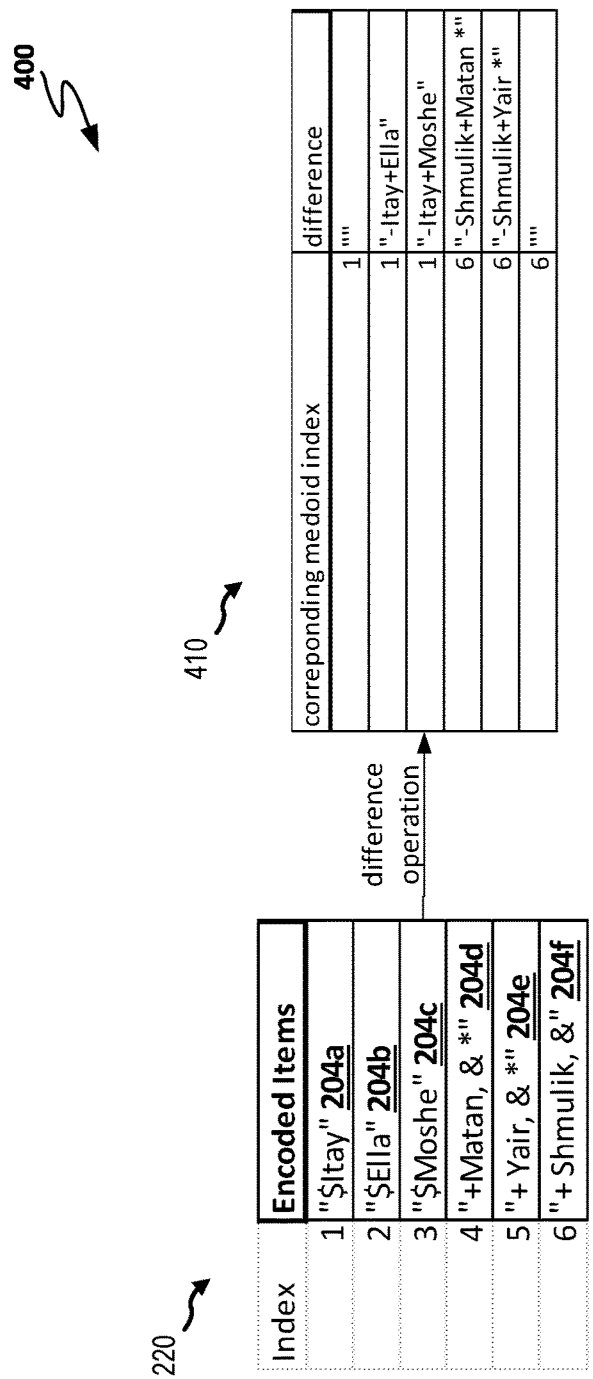
FIG. 4 depicts an example difference operation for medoid-based data compression.

FIG. 4 depicts an example difference operation 400. For example, difference operation 400 can be performed by a difference operator, such as difference operator 124 shown in FIG. 1. Although difference operation 400 illustrated is based on encoded items, such as encoded strings 204*a-f* in table 220, difference operation 400 can be applied to un-encoded items, such as strings 202*a-f* in table 210, as well.

A difference operator can identify a difference between each item and the corresponding medoid. The difference operator can first recognize the medoid associated with each encoded string 204*a-f* from the medoids determined by a cluster generator. For example, the medoids identified can be represented using indices, such as illustrated in table 320 shown in FIG. 3. For each item (e.g., encoded string 204*a-f*), the difference operator can find the difference between the item and the corresponding medoid. The difference operator can use a difference operation algorithm to identify the differences, such as the git diff operation.

Table 410 includes the identified differences generated by a difference operator for each item (e.g., encoded string 204*a-f*) and the corresponding medoid. The identified difference can be the instructions to change from the corresponding medoid to each item. For example, to change from encoded string 204*b* (with index value 2) to its corresponding medoid, which is encoded string 204*a* (with index value 1), the instructions are "−Itay+Ella", where the "−" operation indicates deletion afterwards whereas the "+" operation indicates appending afterwards. In this example, the string "Itay" is replaced in place in encoded string 204*a* by the string "Ella" to generate encoded string 204*b*.

The difference identified for the medoids can be an empty value (e.g., the empty string, numerical value 0, and/or the like), as there is no change needed for the medoids to change to themselves. For example, the identified difference between encoded string 204*a* and its corresponding medoid is the empty string (e.g., " "), as the corresponding medoid for encoded string 204*a* is itself, as illustrated in table 410.

In some examples, the difference includes encoded messages. For example, the identified difference for encoded string 204*d* (with index value 4) is "−Shmulik+Matan *", where "*" can be mapped to a string. For example, "*" can be inversely mapped to the string "for the message", as illustrated in table 230 shown in FIG. 2. In some examples, a decoder (e.g., decoder 126) can decode the encoded message before saving the information to a database (e.g., database 130), such that the difference saved is ""−Shmulik+Matan for the message".

Figure 5:
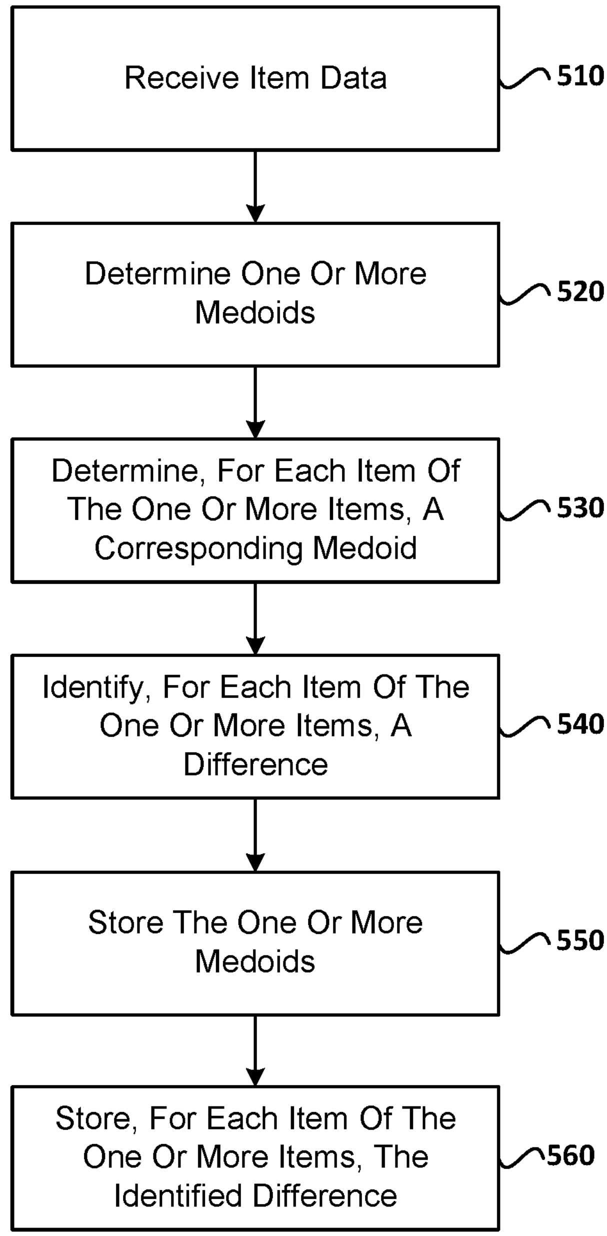
FIG. 5 is a flow diagram of example operations for medoid-based data compression.

FIG. 5 is a flow diagram of example operations 500 for medoid-based data compression. Operations 500 may be performed by a compressor, such as compressor 100 illustrated in FIG. 1.

Operations 500 begin at 510, where the compressor receives item data indicative of one or more items. In some examples, the item data is input item data 110 shown in FIG. 1. In some embodiments, the one or more items are of the same data type.

At 520, the compressor determines one or more medoids based on the item data. The item data can include one or more clusters, where each cluster include one or more items. Each cluster can have a medoid, which is most centrally located object (e.g., item) in the cluster. In some embodiments, the one or more items in the item data are first converted by an encoder, using an encoding scheme (e.g., BPE, word22vec, and/or the like), to generate one or more encoded items. In such embodiments, for each encoded item of the one or more encoded items, distances are computed by a cluster generator from the encoded item to the other encoded items, based on a distance metric, such as L1 distance, L2 distance, or Levenstein distance. In such embodiments, one or more medoids are generated by a cluster generator, using a clustering algorithm, based on the one or more encoded items and the computed distances. The clustering algorithm can be one of k-medoids, DBSCAN, GMM or hierarchical clustering. In some embodiments, the un-encoded item associated with (e.g., sharing an index value with) an encoded item as a medoid is a medoid for the cluster of un-encoded items. In some embodiments, alternatively, an encoder is not used, and the cluster generator can calculate distances between un-encoded items and determine one or more medoids among the un-encoded items.

At 530, the compressor can determine a corresponding medoid for each item of the one or more items, based on the one or more medoids. For example, the clustering algorithm used by the cluster generator can partition the items into one or more clusters, where each cluster has a corresponding medoid. Accordingly, every item in a cluster is associated with a corresponding medoid. In some embodiments, the items are encoded items. In some embodiments, alternatively, the items are un-encoded items.

At 540, the compressor can identify, for each item of the one or more items, a difference between the item and the corresponding medoid for the item. For example, the difference can be a set of changes needed to change from the corresponding medoid for the encoded item to the encoded item. In some embodiments, the difference is generated by a difference operator based on a difference operation on the item and the corresponding medoid for the item. For example, the difference operation can be the git diff operation. In some embodiments, the difference includes an indicator to the corresponding medoid (e.g., an index value of the corresponding medoid).

At 550, the compressor can store the one or more medoids. In some examples, the one or more medoids can be stored in a database. In some examples, each medoid of the one or more medoids is stored only once. In some embodiments, the one or more medoids are encoded items, and each medoid of the one or more are decoded by a decoder based on the encoding scheme (e.g., the inverse mapping of the encoding scheme) before stored into a database.

At 560, the compressor can store, for each item of the one or more items, the identified difference between the item and the corresponding medoid. In some embodiments, the identified difference are encoded, and is decoded by a decoder based on the encoding scheme (e.g., the inverse mapping of the encoding scheme) before stored into a database. In some embodiments, the identified difference includes an indicator to the corresponding medoid (e.g., an index value of the corresponding medoid).

The stored medoids and identified differenes can be used to recreate the each item of the one or more items. For example, an item can be recreated by applying the identified difference of the item to its corresponding medoid. Since the identified difference of an item usually requires less storage space than the item itself, this can help mitigate high storage costs for a large quantity of data.

Figure 6:
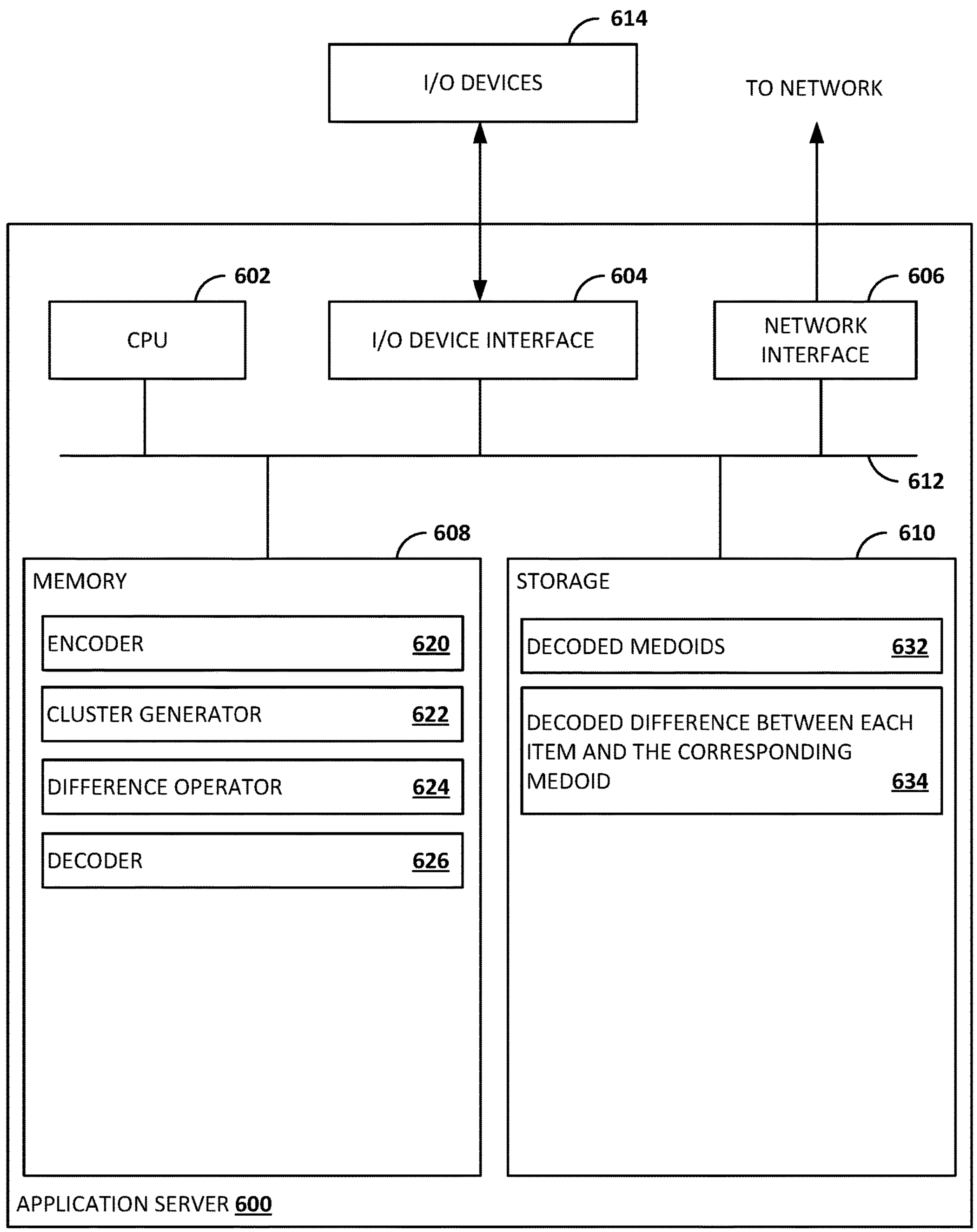
FIG. 6 depicts an example application server.

FIG. 6 depicts an example application server 600, which can be used to deploy compressor 100 of FIG. 1. As shown, application server 600 includes a central processing unit (CPU) 602, one or more input/output (I/O) device interfaces 604, which may allow for the connection of various I/O devices 614 (e.g., keyboards, displays, mouse devices, pen input, etc.) to application server 600, a network interface 606, a memory 608, a storage 610, and an interconnect 612.

CPU 602 may retrieve and execute programming instructions stored in memory 608. Similarly, CPU 602 may retrieve and store application data residing in memory 608. Interconnect 612 transmits programming instructions and application data, among CPU 602, I/O device interface 604, network interface 606, memory 608, and storage 610. CPU 602 is included to be representative of a single CPU, multiple CPUs, a single CPU having multiple processing cores, and the like. I/O device interface 604 may provide an interface for capturing data from one or more input devices integrated into or connected to application server 600, such as keyboards, mice, touchscreens, and so on. Memory 608 may represent a random access memory (RAM), while storage 610 may be a solid state drive, for example. Although shown as a single unit, storage 610 may be a combination of fixed and/or removable storage devices, such as fixed drives, removable memory cards, network attached storage (NAS), or cloud-based storage. In some embodiments, storage 610 is an example of database 130 of FIG. 1.

As shown, memory 608 includes encoder 620, cluster generator 622, difference operator 624, and decoder 626. Encoder 620, cluster generator 622, difference operator 624, and decoder 626 may be the same as or substantially similar to encoder 120, cluster generator 122, difference operator 124 and decoder 126 of FIG. 1, respectively.

As shown, storage 610 includes decoded medoids 632 and decoded difference between each item and the corresponding medoid 634. Decoded medoids 632 and decoded difference between each item and the corresponding medoid 634 may be the same as or substantially similar to the output of decoder 126 of FIG. 1. Alternatively, Decoded medoids 632 and decoded difference between each item and the corresponding medoid 634 may be the same as or substantially similar to the output of the difference operator 624, if an encoder and a decoder is not used.

It is noted that the components depicted in application server 600 are included as examples, and other types of computing components may be used to implement techniques described herein. For example, while memory 608 and storage 610 are depicted separately, components depicted within memory 608 and storage 610 may be stored in the same storage device or different storage devices associated with one or more computing devices.

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

What is claimed is:

1. A method, comprising:

receiving item data indicative of one or more items;

converting, using an encoding scheme, each item of the one or more items into an encoded item to generate one or more encoded items;

determining one or more medoids based on the one or more encoded items;

determining, for each encoded item of the one or more encoded items, a corresponding medoid based on the one or more medoids;

identifying, for each encoded item of the one or more encoded items, a respective set of changes needed to change from the corresponding medoid for the encoded item to the encoded item;

decoding each medoid of the one or more medoids based on the encoding scheme to generate one or more decoded medoids;

storing the one or more decoded medoids;

decoding, for each encoded item of the one or more encoded items, the respective set of changes needed to change from the corresponding medoid for the encoded item to the encoded item based on the encoding scheme; and storing, for each item of the one or more items, the decoded respective set of changes needed to change from the corresponding medoid for the encoded item to the encoded item.

2. The method of claim 1, wherein determining one or more medoids based on the one or more encoded items comprises:

computing, for each encoded item of the one or more encoded items, distances from the encoded item to other items of the encoded items; and generating, using a clustering algorithm, one or more medoids based on the one or more encoded items and the computed distances.

3. The method of claim 2, wherein identifying, for each encoded item of the one or more encoded items, the respective set of changes needed to change from the corresponding medoid for the encoded item to the encoded item further comprises identifying the respective set of changes based on a difference operation on the encoded item and the corresponding medoid for the item.

4. The method of claim 3, wherein the difference operation is git diff operation.

5. The method of claim 2, wherein the encoding scheme is Byte-Pair-Encoding (BPE).

6. The method of claim 2, wherein the distances are Levenstein distances.

7. The method of claim 2, wherein the clustering algorithm is one of k-medoids, DB SCAN, GMM or hierarchical clustering.

8. A system for efficiently rendering form data, comprising:

a memory including computer-executable instructions; and a processor configured to execute the computer-executable instructions and cause the system to:

receive item data indicative of one or more items;

convert, using, an encoding scheme, each item of the one or more items into an encoded item to generate one or more encoded items;

determine one or more medoids based on the one or more encoded items;

determine, for each encoded item of the one or more encoded items, a corresponding medoid based on the one or more medoids;

identify, for each encoded item of the one or more encoded items, a respective set of changes needed to change from the corresponding medoid for the encoded item to the encoded item;

decode each medoid of the one or more medoids based on the encoding scheme to generate one or more decoded medoids;

store the one or more decoded medoids;

decode, for each encoded item of the one or more encoded items, the respective set, of changes needed to change from the corresponding medoid for the encoded item to the encoded item based on the encoding scheme; and store, for each item of the one or more items, the decoded respective set of changes needed to change from the corresponding medoid for the encoded item to the encoded item.

9. The system of claim 8, wherein determining one or more medoids based on the one or more encoded items further comprises:

computing, for each encoded item of the one or more encoded items, distances from the encoded item to other items of the encoded items; and generating, using a clustering algorithm, one or more medoids based on the one or more encoded items and the computed distances.

10. The system of claim 9, wherein identifying, for each encoded item of the one or more encoded items, the respective set of changes needed to change from the corresponding medoid for the encoded item to the encoded item further comprises identifying the respective set of changes based on a difference operation on the encoded item and the corresponding medoid for the encoded item.

11. The system of claim 10, wherein the difference operation is git diff operation.

12. The system of claim 9, wherein the encoding scheme is Byte-Pair-Encoding (BPE).

13. The system of claim 9, wherein the distances are Levenstein distances.

14. The system of claim 9, wherein the clustering algorithm is one of k-medoids, DBSCAN, MINI or hierarchical clustering.

15. A non-transitory computer readable medium comprising instructions to be executed in a computer system, wherein the instructions when executed in the computer system perform a method for efficiently rendering form data on a computing device, comprising:

receiving item data indicative of one or more items;

converting, using an encoding scheme, each item of the one or more items into an encoded item to generate one or more encoded items;

determining one or more medoids based on the one or more encoded items;

determining, for each encoded item of the one or more encoded items, a corresponding medoid based on the one or more medoids;

identifying, for each encoded item of the one or more encoded items, a respective set of changes needed to change from the corresponding medoid for the encoded item to the encoded item;

decoding each medoid of lie one or more medoids based on the encoding scheme to generate one or more decoded medoids;

storing the one or more decoded medoids;

decoding, for each encoded item of the one or more encoded items, the respective set of changes needed to change from the corresponding medoid for the encoded its to the encoded item based on the encoding scheme; and storing, for each item of the one or more items, the decoded respective set of changes needed to change from the corresponding medoid for the encoded item to the encoded item.

16. The non-transitory computer readable medium of claim 15, wherein determining one or more medoids based on the one or more encoded items further comprises:

computing, for each encoded item of the one or more encoded items, distances from the encoded item to other items of the encoded items; and generating, using a clustering algorithm, one or more medoids based on the one or more encoded items and the computed distances.

* * * * *